(12) United States Patent
Ratayczak et al.

(10) Patent No.: US 6,259,909 B1
(45) Date of Patent: Jul. 10, 2001

(54) METHOD FOR SECURING ACCESS TO A REMOTE SYSTEM

(75) Inventors: Georg Ratayczak, Gangelt; Norbert Niebert, Aachen, both of (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/111,868

(22) Filed: Jul. 8, 1998

(51) Int. Cl.[7] ....................................... H04M 1/66
(52) U.S. Cl. ..................... 455/411; 455/410; 455/414
(58) Field of Search ................................ 455/410, 411, 455/414; 379/188

(56) References Cited

U.S. PATENT DOCUMENTS

| | | | |
|---|---|---|---|
| 5,668,875 | * 9/1997 | Brown et al. ........................... | 380/23 |
| 5,745,559 | * 4/1998 | Weir ....................................... | 455/411 |
| 5,774,525 | * 6/1998 | Kanevsky et al. ..................... | 379/188 |
| 5,907,597 | * 5/1999 | Mark ...................................... | 379/188 |
| 5,991,617 | * 11/1999 | Powell .................................. | 455/410 |
| 6,091,945 | * 7/2000 | Oka ....................................... | 455/410 |
| 6,091,946 | * 7/2000 | Ahvenainen et al. ................. | 455/411 |
| 6,112,078 | * 8/2000 | Sormunen et al. .................... | 455/411 |

FOREIGN PATENT DOCUMENTS

92/04671   3/1992   (WO).

* cited by examiner

Primary Examiner—Daniel Hunter
Assistant Examiner—Thuan T. Nguyen
(74) Attorney, Agent, or Firm—Burns, Doane, Swecker & Mathis, L.L.P.

(57) ABSTRACT

Method for secure user access to a remote system using a communications device. Access to the system is released only after the input of valid code words via independent communications devices. One of the communications devices may be a data processing unit and the second communications device may be a mobile telephone.

27 Claims, 2 Drawing Sheets

METHOD FOR SECURING ACCESS TO A REMOTE SYSTEM

The present invention relates to a method for securing access to a system. In particular, the invention relates to a method for securing access to data of a remote system using a communications apparatus.

Because of the increasingly widespread deployment and use of data networks, security aspects are becoming increasingly important in various applications. These may be applications in which secret information is transferred between data processing devices via a data network, e.g. in electronic payments transactions, electronic "shopping" and the like. Most importantly, security requirements include, apart from secure transmission of data via the network, the identification of an authorized user. In particular, when an authorized user wishes to access, via a publicly accessible data network, to a system and/or to data stored there and associated with it, it must be ensured by specific arrangements, that only the authorized user can access associated data.

For example, the data network can be an internet, comprising a large number of computers are connected with each other to form a generally accessible network. Since in such a network there are no secure data transmission lines, other ways are required to secure data and to identify an authorized user.

In general, a secure unit requests the input of a code word for authenticating a user, thus clearly identifying the user.

This process of securing access from a communications device to a remote system is generally known. An example is shown in FIG. 8. C' marks a communications device, A' an access device and S' the system. Access from the communications device to the system is cleared as follows: in a first step, a code word is entered at the communications device C'. It is then transmitted to the access device A' where it is checked for validity. In case the code word is determined to be valid, the access device releases access to the system by the communications device C'.

A large number of such processes, identifying a subscriber by means of such code word, are known. However, like the example described above, they do have the disadvantage that the knowledge of the code word allows an unauthorized user to, e.g., access data of another user or to otherwise take not allowed influence on the system.

It is therefore object of the invention to provide a method for securing access to data allowing greater security in authenticating an authorized user wishing to access said data.

This object of the present invention is solved methods with the features of claims 1. The method with the features of claim 1 advantageously allows the secure identification of a user, by using two individual connections between a first and a second communications device and a determining device, in order to transmit a first and a second code word to the determining device for checking.

The problem of the present invention is furthermore solved by a method with the features of patent claim 3. The method in accordance with claim 3 permits improved security of access to the system due to the fact that after the transmission and checking of a first code word by the determining device, a second code word is transmitted to the second communications device, for input into the first communications device and transmission from the first communications device and the transmission device for checking.

In an advantageous embodiment of the invention, a data processing device can be used as one of the two communications devices, connected to the determining device via a data network. A telephone can be used as the second communications device, connected to the determining device via a telephone line.

The connections can particularly advantageously be established via an Internet and/or via a mobile radio network. In this connection it is possible that after establishing the connection between the data processing device and the determining device and after input of the code word by depressing one or more keys on the mobile telephone, access to the system and/or to subscriber data stored in a data memory of the system is released. By use of a mobile telephone allocated to a subscriber, a secure identification of the subscriber can be carried out.

In a further advantageous embodiment of the method in accordance with the invention, the transmission device may generate a code word using a secret algorithm. The code word may be transferred to one of the communications devices for input into the other one of the two communications devices, and for subsequent retransmission to the access device for investigation. This allows a further enhanced security.

In addition, one of the code words can be used to carry out data encoding of data transmitted between one or both of the communications devices and the determining device. In general, a code word may be derived from predetermined subscriber data, the date or the time. Further, the code word may be valid for only one access procedure.

For the implementation of the method for securing access to a system, advantageously an access device may be used, which on the one hand is connected with the system and on the other is connected, via separate communication paths, with two communication devices for the transmission of code words and for access to the system, preferably a data processing unit and a telephone/mobile telephone.

Further embodiments and advantageous modifications of the method become obvious with the subclaims.

In the following, the invention is described with respect to the figures.

Figure 1:
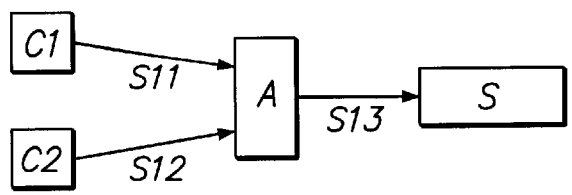
FIG. 1 shows a schematic illustration of an embodiment of the method in accordance with the invention for securing access to a remote system.

FIG. 1 shows a first embodiment of the method in accordance with the invention, wherein individual process steps are illustrated using arrows. FIG. 1 shows first communications device C1, a second communications device C2 as well as an access device A and a system S, to which access is to be obtained. Further devices, such as for example communications lines, data transmission devices and the like are not shown. Reference numerals S11, S12 and S13 denoting the arrows illustrate process steps which are carried out successively in the embodiment of the method in accordance with the invention.

Figure 2:
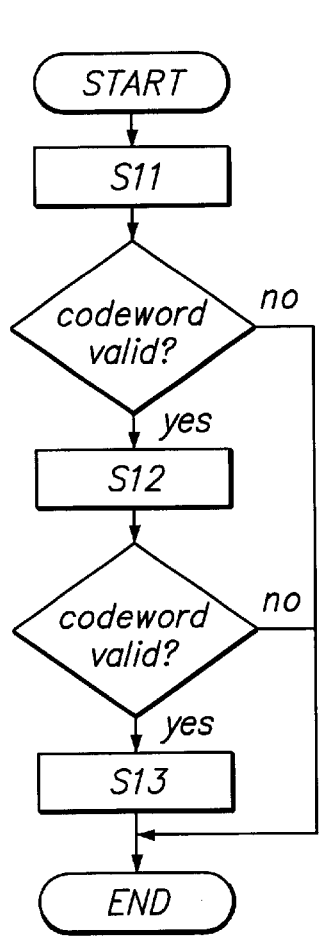
FIG. 2 shows a flow diagram of the embodiment of the method in accordance with the invention of FIG. 1.

FIG. 2 shows a flow diagram of the embodiment shown in FIG. 1 to further clarify the process in accordance with the invention for securing access to a remote system.

In the following, steps for executing the procedure in accordance with FIGS. 1 and 2 will be described. At first, the step denoted S11 is carried out. In step S11, a first connection is established from the communications device C1 to an access device A and, besides identifying a user, a first code word is transmitted from the first communications device C1 to the access device A. The first code word is received by the access device A and it is compared with authentication data stored in access device A. The comparison can be a known procedure for the verification of a transmitted code word. For example, in access device A, a copy of the first code word could be stored and it could be determined by comparison, whether the code word which was transmitted is the requisite code word. It could also be determined by a mathematical operation whether the first code word is correct, by checking a particular relationship to the authentication data which are stored in access device A. If the first code word is determined as being incorrect, the execution of the process proceeds to the end point of the flow diagram shown in FIG. 2. If the first code word is found to be correct, the process moves on to a step S12.

In step S12, a connection is established from the second communications device C2 to access device A. A second code word is transmitted via this connection to the access device. This second transmitted code word is received at the access device and is authenticated, as was already described in step S11. The code word can be a fixed sequence of signs, which identify the user and a code portion which is known only to the user. But identification of the user may also be carried out in a differently. If no user assigned code word has been transmitted, the process moves on to the end point shown in the flow diagram of FIG. 2. If the second code word is determined to be correct, the process moves on to step S13.

In step S13, access to the system S is released by the access device A from one or both of the communications devices C1, C2. This access to system S may be such that data can be transferred to system S and/or data can be retrieved from system S via one or both of the communications devices C1, C2. In addition, it is possible that the authorized user can trigger certain functions of the system S via one or both of the communications devices C1, C2. In the embodiment described, process steps are carried out in sequence, preferably in the sequence S11–S13. However, modifications of this sequence or partial steps are possible.

As in the case of a device described in more detail later with reference to FIG. 7, in a second embodiment a data processing unit can be used as the first communications device C1 and wherein the connection between this data processing unit and the access device A is established via a data processing network.

The data processing unit may be constituted by a personal computer available on the market, which is equipped with a suitable modem. The connection between the personal computer and the access device A may be established via a data network, for example the Internet. The provision of a connection from a computer via an internet to the access device A, which may also be constituted by a computer or a server, optionally with special functions and features, is well known and will not be further explained at this point.

In addition, in the second embodiment, the second communications device C2 may be constituted by a telephone and the connection between the telephone and the access device A may be established via a telephone network. In this connection, the telephone network may preferably be a mobile radio network or a conventional fixed telephone network and/or PSTN.

Thereby it is possible that the connections between the first and/or second communications devices C1, C2 and the access device A may be established via separate communications routes independent from each other.

Furthermore, in the second embodiment, the system S to be accessed, may be a mobile radio network and/or a memory device of the mobile radio network, in which specific subscriber-related data are stored, but in particular a telephone network in accordance with the GSM standard. In case of a GSM network, the access device may advantageously be an expansion of the HLR (home location register) which forms a unit with a server of the worldwide web (WWW) and/or of the Internet. In this embodiment, access is advantageously controlled to the HLR (home location register) by the access device A. In thie HLR register, subscriber-specific data are stored, for example for services such as forwarding of calls or other configuration settings which concern the subscriber. The above described embodiment enables a subscriber a secure access to the communication network or to subscriber data associated with him stored in the HLR register.

Therefore the user may alter in a particularly convenient way, for example, configuration settings, activate certain services and deactivate them and may retrieve, change or store information and data. The communication between the user and the system, necessary for transmission of the code words, may be carried out, inter alia, via USSD (unstructured supplementary service data).

Access to subscriber-specific data stored in the HLR register in this embodiment may be carried out as follows when relying on the method in accordance with the invention shown in FIGS. 1 and 2.

A subscriber wishing access to the subscriber data in the HLR register associated with him, establishes a connection between a data processing unit constituting one of the communications devices and which is connected by the internet (WWW client) to access device A. In this case, this is an internet server forming a unit with an expansion of the HLR. Authentication of the user and/or subscriber is carried out by the transmission and validation of the first code word in step S11, shown in FIGS. 1 and 2, to access device A. Here, the communication between the data processing unit and the access device A may be performed in accordance with a so-called TCP/IP protocol.

If the access device A determines the user as being authorized, access device A awaits an input of a second code word via a second communications device, in this case the mobile telephone or a fixed network telephone (step S12). In further embodiments, access device A may transmit a request for an input of the second code word (step 12) via an interface to the GSM network of the mobile telephone or of a fixed network telephone. The input of the code word may be carried out using a telephone keyboard by pressing a single key, for example the call demand key, or by pressing a sequence of keys.

After authorization of the second code word and therefore of the subscriber at access device A, the access device allows access to system S (step S13 in FIGS. 1 and 2).

This may be access to subscriber-specific data stored in the memory device of the HLR register or it may be an activation or deactivation of certain services. After access has been granted, one of the two communications devices C1, C2, i.e. the data processing unit or the telephone or both, may actually be used for accessing the system.

By means of this procedure, for example a selective access of a particular subscriber of a mobile radio network to data assigned to this subscriber may be made allowed. Preferably, by this proceeding, access is granted only to subscriber-specific data and services which assigned to a specific subscriber. For example, in a GSM network, the identity of the specific mobile telephone used by a particular user is permanently known, and therefore a fraudulent authentication of a particular subscriber may not be performed using any other communications device.

By the input of at least one further code word via one of the communications devices C1, C2 and by transmission of this at least one further code word to access device A, expanded access to the system or to subscriber data stored in the memory device of the HLR register may be allowed.

Figure 3:
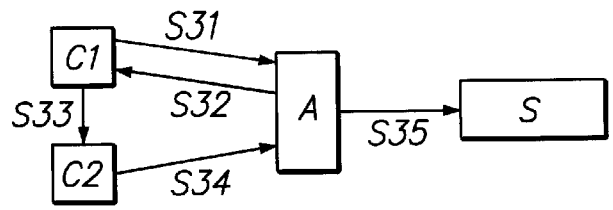
FIG. 3 shows a schematic illustration of a further embodiment of the method in accordance with the invention.

In FIG. 3, a third embodiment of the method in accordance with the invention for securing access to a remote system is shown will be described. As already shown in the first embodiment of FIG. 1, a first communications device C1, a second communications device C2, an access device A and a system S are illustrated. In addition, arrows representing individual process steps are denoted by S31 to S35. The process steps are preferably carried out successively in the sequence S31 to S35. However, modifications of this sequence or of partial steps are possible.

Figure 4:
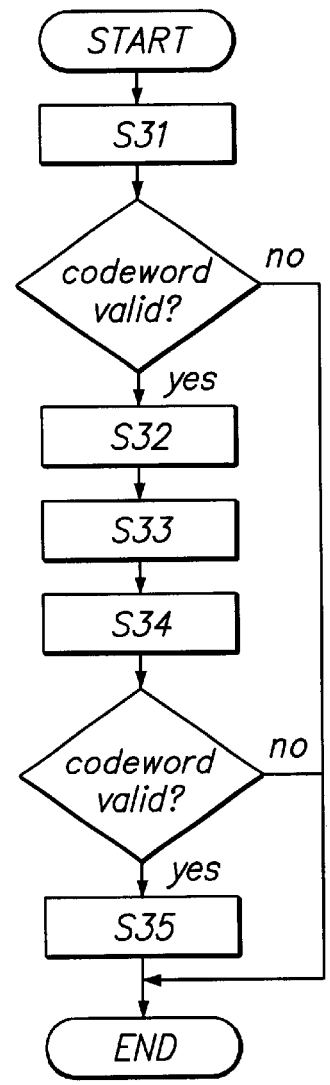
FIG. 4 shows a flow diagram of the embodiment of the method in accordance with the invention of FIG. 3.

FIG. 4 shows a flow diagram of the embodiment in FIG. 3 to further outline the embodiment of the invention.

In the following, the process steps of FIGS. 3 and 4 will be described in more detail. In a first step S31, a communication is established between the first communications device C1 and the access device A and, apart from a user identification, a first code word is transmitted to access device A. The access device compares the first code word with stored authentication data. This may be done similar to the authentication procedure already described with respect to example of embodiment 1. If the code word is not recognized as correct, the process ends, as shown in FIG. 4. Otherwise, the sequence of steps proceeds to step S32.

In step S32, a second code word is transmitted from access device A to the communications device C1, e.g., for display. This second code word may be a predetermined code word or it may be generated by access device A using a secret algorithm. For example, the second code word may be derived from subscriber-specific identification data and/ or the time and/or the date. Thereby it becomes possible that this second code word or another code word generated by access device A is only valid for one access. In addition, the second or another code word may be used for data encoding a data transmission between the first or the second communications device C1, C2 and the access device A.

In a step S33 the second code word is transmitted from the first communications device C1 to the second communications device C2. This may be done by a read out operation from the first communications device C1 and an input operation at the second communications device C2 or by another form of data transmission.

After input of the second code word at the second communications device C2, in a step S34 the second code word is transmitted to the access device A and is authenticated there in accordance with the authentication process which was described above. If the second code word transmitted to the access device is determined to be incorrect, the process moves on to END, as shown in the flow diagram of FIG. 4.

If the code word is recognized as being valid, in step S35 access from one of the communications devices C1, C2 to system S is granted, as it was described above in more detail with reference to the first or second embodiment. In a modification of this third embodiment, it is possible that after transmission of a first code word from the communications device C1 and thereafter of a second code word from communications device C2 to access device A, a third code word is transmitted from access device A to the communications device C1 and from there to communications device C2, and is then transferred by communications device C2 to access device A for authentication.

Figure 7:
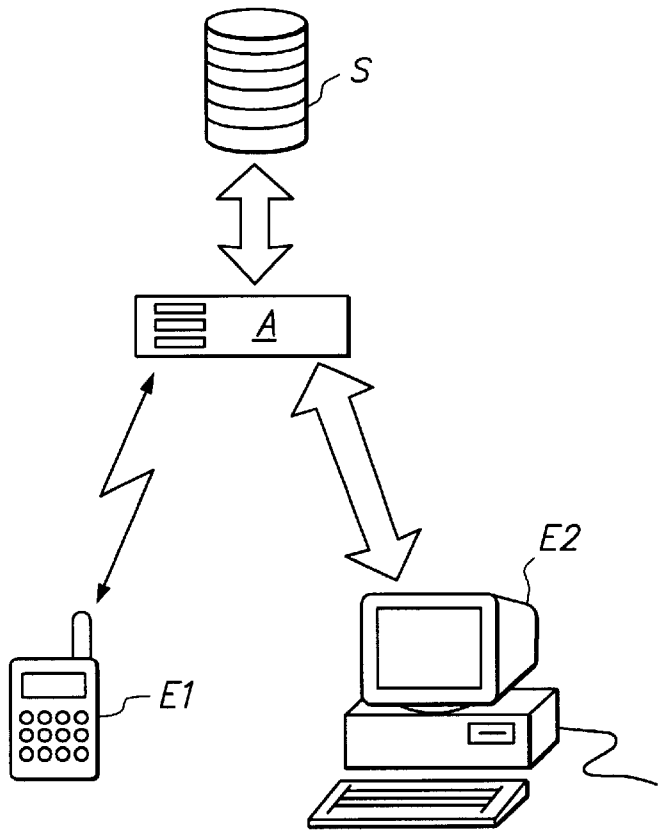
FIG. 7 shows a block diagram of a device for carrying out the method in accordance with the invention.
Figure 8:
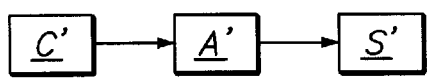
FIG. 8 shows a schematic illustration of a known access procedure.

As with respect to the second embodiment, and also with respect to FIG. 7, in order to realize the inventive proceeding, the communications device C1 may be a data processing unit connected with access device A via the internet, and the communications device C2 may be a telephone and/or a mobile telephone, connected to access device A via a fixed telephone network and/or a mobile radio network. As was described in the embodiment, in this case, code words may be transmitted by the telephone by activating a sequence of telephone keys or a separate telephone key, such as, for example, the call connection key.

Attention is drawn to the fact that in other examples of embodiments, the communications device C1 may be a telephone/mobile telephone and/or the communications device C2 may be a data processing unit. In addition, the second code word which is transmitted from access device A to communications device C1 may be generated by access device A, for example using subscriber-specific identification data and/or the time and/or the date. Thus it is possible that this second code word, or another code word generated by access device A, is valid only for one access session. Furthermore, one of the code words transmitted may be used for data encoding in a data transmission between the first or the second communications devices C1, C2 and the access device A. This may improve the security of access to the system. Preferably, the second code word generated by access device A would be used for such data encoding.

By inputting of at least one further code word via one of the communications devices C1, C2 and by transmission of this at least one further code word to access device A, expanded access to the system or to other data stored in the memory device of the system may be released.

Figure 5:
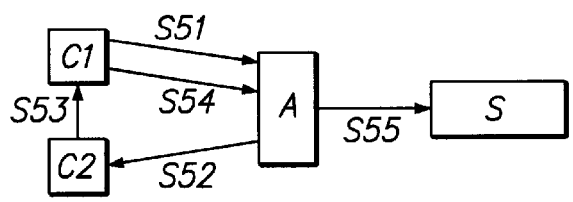
FIG. 5 shows a schematic illustration of another embodiment of the method in accordance with the invention.
Figure 6:
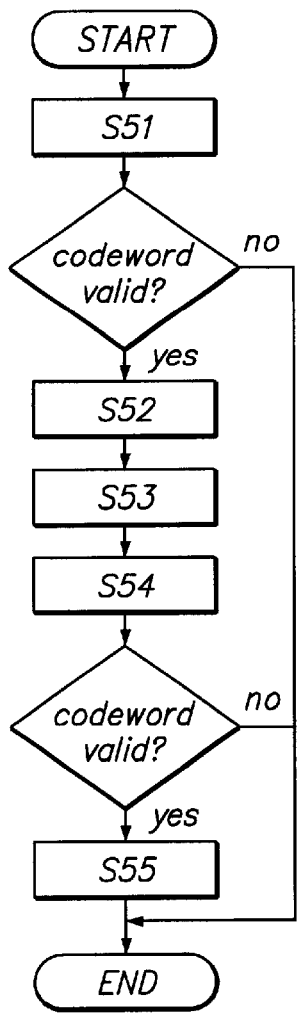
FIG. 6 shows a flow diagram of the embodiment of the inventive method in accordance with FIG. 5.

FIG. 5 describes a further embodiment for a realization of the method in accordance with the invention for secure access to a remote system. As has already been described with respect to the embodiments 1 and 3, FIG. 5 schematically illustrates a first communications device C1, a second communications device C2, an access device A and a system S. To further outline the procedure and their realization, process steps S51 to S55 are denote arrows. FIG. 6 shows a flow diagram for further explaining the drawing shown in FIG. 5.

Below the realization of the method in accordance with the invention for secure access by a user to the remote system S is described with regard to FIGS. 5 and 6.

In process step S51, as in steps S11 and S31, a first connection is established between a first communications device C1 an access device A, and, apart from a user identification, a first code word is transmitted from the first communications device C1 to access device A where it is authenticated. If the transmitted code word is found to be invalid, the process moves on to the end point of the flow diagram shown in FIG. 6. If the code word is found to be valid, the process moves on to step S52.

In step S52, by access device A a second code word is generated, for example by means of a secret algorithm, as was already described with respect to the third embodiment, or a predetermined value is transmitted as the second code word to the second communications device C2.

In a subsequent step S53, the second code word is transmitted from the second communications device C2 to a first communications device C1. For this purpose the second communications device C2 may display the second code word for an input into the first communications device C1, or it may be transmitted in another way from the second communications device C2 to the first communications device C1.

In a further step S54, the second code word is transmitted from the first communications device C1 to access device A and is checked there for correctness, as described above. If the code word transmitted in step S54 is determined to be invalid, the process moves on to the end point of the flow diagram shown in FIG. 6.

If the second code word transmitted in step S54 is found to be valid, in step S35 data access or access to functions of the system is released by access device A. This access to data or to functions of the system may be carried out, as described above, by one of the communications devices C1, C2.

As in the examples of embodiments described above, the connections between the first communication device C1 and/or the second communications device C2 and the access device A may be established via separate communications routes independent from each other. Furthermore, as it was described with respect to the example of embodiment 2, the first communications device C1 may be a data processing unit and the connection between access device A and the data processing unit may be established via a data processing device network. Preferably, a data processing unit is selected as the first communications device C1 and a mobile telephone as the second communications device.

In this fourth embodiment, the second code word transmitted to communications device C1 in step S52 may be computed using subscriber-specific data and/or a date and/or a time and, in certain cases, it may be valid only for a single access session. In addition, the communications device C2 may be a telephone or a mobile telephone, and the connection between communications device C2 and access device A may be established via a fixed telephone network and/or via a mobile telephone network. Attention is drawn to the fact that the communications device C1 may also be a telephone or a mobile telephone, and communications device C2 may be a data processing unit.

The transmission of the code words may be carried out as was already described in the second embodiment. The grant of access to system S may be such that a subscriber can access subscriber data allocated to him, change or store them, or the subscriber may be allowed to activate or deactivate certain services. The subscriber data are preferably stored in a home location register (HLR). Should a mobile telephone be used as the communications device, access to subscriber data may advantageously be restricted to subscriber data allocated to a subscriber, to whom the used mobile telephone is allocated.

In addition, one of the transmitted code words may be used for data encoding in data transmission between the first or second communications devices C1, C2 and access device A. Moreover, after release of data access by the access device A at least one further code word may be transmitted from one of the communications devices C1, C2 to access device A, in order to release expanded access to the system or to other data which are stored in the memory device.

FIG. 7 shows an embodiment of a device for carrying out the method in accordance with the invention. The figure shows an access device marked A to control access by a user to a remote system S.

The double arrow shown between access device A and system S marks a data connection existing between these two devices. In the case of a GSM system, the access device and the system may communicate with each other within the framework of the MAP (mobile application part) protocol.

E1 shows a mobile telephone. An arrow connects with access device A, denoting, e.g, a mobile radio network. In addition, FIG. 7 shows a data processing unit D2. A double arrow connects with access device A, denoting any data connection. E.g., this data connection may be an internet and communication may be carried out in accordance with the TCP/IP protocol.

In accordance with a process shown in connection with the examples of embodiments 1 to 4 for the authentication of a user, in the case of correct input of the code words, the access device releases access to the system. Then either by the mobile telephone E1 and/or the data processing unit E2 via the respective connections to the access device, access to a system S can be obtained. In the embodiment, supported by a graphic display of the data processing unit E2, the subscriber-specific user profile in an HLR of a memory device of a mobile radio network, for example a GSM network, may be stored, retrieved or changed. It is furthermore conceivable that other functions of system S may be controlled by one of the data processing devices G. In addition, by the input of further code words, after connection has been established between the devices E1, E2, access to further functions of system S or to other subscriber-specific data in the subscriber register HLR may be enabled.

What is claimed is:

1. A method for secure user access to a separate system having data stored in a memory device, comprising the following steps:

establishing a first connection between a first communications device and an access device and transmission of a first code word from the first communications device to the access device;

comparing the first code word with first authentication data stored in the access device;

establishing a second connection between a second communications device and the access device, and transmitting a second code word form the second communications device to the access device;

comparing the second code word with second authentication data stored in access device;

transmitting a third code word from access device to the first communications device;

transmitting the third code word from the first communications device to the second communications device;

transmitting the third code word from the second communications device to the access device; and granting access to the system via at least one of the communications devices, given a valid third code word and the presence of a predetermined relationship between the first and second code words and the second authentication data stored in access device.

2. The method in accordance with claim 1, including establishing the first and second connection via communications routes independent form each other.

3. The method in accordance with claim 1, wherein at least the first communications device is constituted by a data processing unit and the connection between the data processing unit and the access device is established via a data processing device network.

4. The method in accordance with claim 3, wherein a internet is used for the connection between access device and the data processing unit.

5. The method in accordance with claim 1, wherein a telephone is used as one of the communications devices and the connection between the telephone and access device is established via a telephone network.

6. The method in accordance with claim 5, wherein a mobile telephone is used as communications device.

7. The method in accordance with claim 6, wherein at least one of the code words is transmitted by pressing a call demand key.

8. The method in accordance with claim 7, wherein the system is a GSM network and the memory device is a home location register storing subscriber-specific data.

9. The method in accordance with claim 1, wherein at least one of the code words is generated by access device and is valid only for one access session.

10. The method in accordance with claim 9, wherein at least one of the code words is generated using a subscriber identification and at least one of time and date.

11. The method in accordance with claim 1, wherein one of the code words is used for data encoding in a data transmission between the access device and at least one of the first and second communications devices.

12. The method in accordance with claim 1, wherein after the release of data access via one of the communications devices, at least one further code word is transmitted to access device to release expanded access to the system.

13. A device for carrying out the method in accordance with claim 1, comprising
an access device connected to the system;
a data processing unit connectable to the access device via a data processing device network; and
a telephone connectable to the access device via a communication network.

14. A method for secure user access to a separate system having data stored in a memory device, comprising the steps below:
establishing a first connection between a first communications device and an access device and transmission of a first code word from the first communications device to access device;
comparing the first code word with first authentication data stored in the access device;
given the presence of a predetermined relationship between the first code word and the authentication data stored in the access device, establishing a second connection between the access device and a second communications device and transmitting a second code word from access device to the second communications device;
transmitting the second code word from the second communications device to the first communications device;
transmitting the second code word from the first communications device to access device;
comparing the second code word with second authentication data stored in access device; and
granting access to the system with at least one of the communication devices, given the presence of a predetermined relationship between the second code word and the second authentication data stored in the access device.

15. The method in accordance with claim 14, including establishing the first and second connection via communications routes independent from each other.

16. The method in accordance with claim 14, wherein at least the first communications device is constituted by a data processing unit and the connection between the data processing unit and the connection between the data processing unit and the access device is established via a data processing device network.

17. The method in accordance with claim 16, wherein an internet is used for the connection between access device and the data processing unit.

18. The method in accordance with claim 14, wherein a telephone is used as one of the communications devices and the connection between the telephone and access device is established via a telephone network.

19. The method in accordance with claim 18, wherein a mobile telephone is used as communications device.

20. The method in accordance with claim 19, wherein at least one of the code words is transmitted by pressing a call demand key.

21. The method in accordance with claim 20, wherein the system is a GSM network and the memory device is a home location register storing subscriber-specific data.

22. The method in accordance with claim 14, wherein one of the code words is generated by access device and is valid only for one access session.

23. The method in accordance with claim 22, wherein at least one of the code words is generated using a subscriber identification and at least one of time and date.

24. The method in accordance with claim 14, wherein one of the code words is sued for data encoding in a data transmission between the access device and at least one of the first and second communications devices.

25. The method in accordance with claim 14, wherein after the release of data access via one of the communications devices, at least one further code word is transmitted to access device to release expanded access to the system.

26. A device for carrying our the method in accordance with claim 14, comprising
an access device connected to the system;
a data processing unit connectable to the access device via a data processing device network; and
a telephone connectable to the access device via a communications network.

27. The method in accordance with claim 1, wherein the second code word is equal to the third code word.

* * * * *